United States Patent [19]

Denhez et al.

[11] Patent Number: 4,692,932
[45] Date of Patent: Sep. 8, 1987

[54] TRIPLICATED CLOCK DISTRIBUTION DEVICE FOR USE WHEN EACH CLOCK SIGNAL COMPRISES A SYNCHONIZATION SIGNAL

[75] Inventors: Alain Denhez, Velizy-Villacoublay; Francis Hargoaa, Paris; Jean Aubrée, Bougival, all of France

[73] Assignee: Alcatel, Paris, France

[21] Appl. No.: 826,705

[22] Filed: Feb. 6, 1986

[30] Foreign Application Priority Data

Feb. 7, 1985 [FR] France ................................ 85 01721

[51] Int. Cl.[4] ............................ H04L 7/00; H04J 3/06
[52] U.S. Cl. ..................................... 375/107; 375/106; 455/51; 307/269; 328/72
[58] Field of Search ....................... 375/106, 107, 111; 455/51; 307/269, 200 A, 527; 328/72

[56] References Cited

U.S. PATENT DOCUMENTS

| | | | |
|---|---|---|---|
| 4,164,629 | 8/1979 | Ollivier et al. ........................ | 375/108 |
| 4,276,645 | 6/1981 | Lager et al. ........................... | 340/508 |
| 4,480,198 | 10/1984 | Gass ..................................... | 375/107 |
| 4,489,412 | 12/1984 | Duplessis et al. ...................... | 370/16 |

FOREIGN PATENT DOCUMENTS

| | | | |
|---|---|---|---|
| 505604 | 11/1979 | Australia . | |
| 0190730 | 8/1985 | European Pat. Off. ............. | 375/106 |
| 0190729 | 8/1986 | European Pat. Off. ............. | 375/106 |
| 0225982 | 11/1985 | Japan .................................... | 375/107 |
| 1527160 | 10/1978 | United Kingdom . | |

OTHER PUBLICATIONS

"System X: Subsystems, Part 2-The Network Synchronization Subsystem" by R. A. Roulter; POEEJ, vol. 73, (Jul. 1980), pp. 88-91.

Primary Examiner—James J. Groody
Assistant Examiner—Michael D. Parker
Attorney, Agent, or Firm—Sughhrue, Mion, Zinn, Macpeak & Seas

[57] ABSTRACT

A triplicated clock distribution device, for use where each clock signal comprises a synchronization signal, comprises three slave clocks connected to receivers. Each slave clock comprises a clock generator and a synchronization generator and delivers a clock signal incorporating a synchronization signal the frequency of which is half that of the clock signal. Each receiver comprises a clock regenerator and a synchronization regenerator which respectively deliver a clock signal and a synchronization signal to user circuits to which the receiver is connected.

9 Claims, 10 Drawing Figures

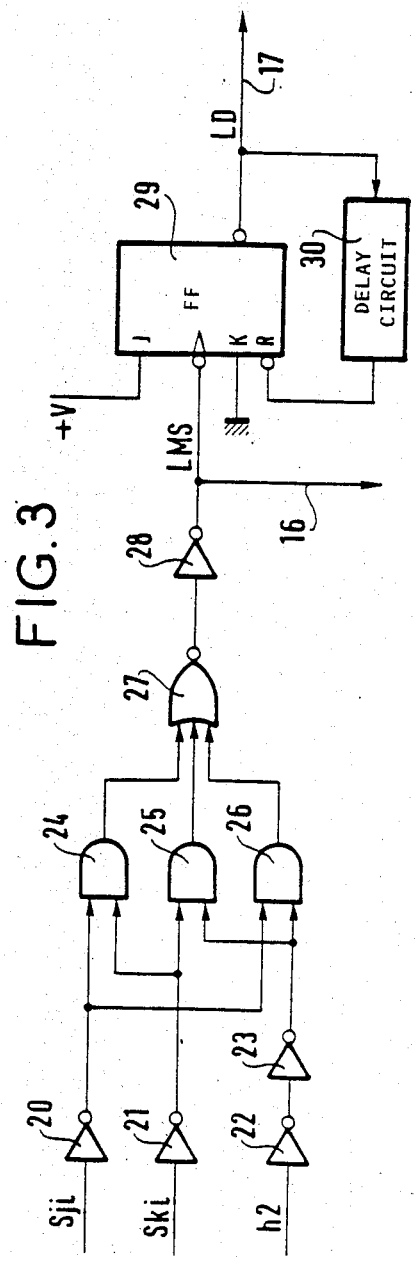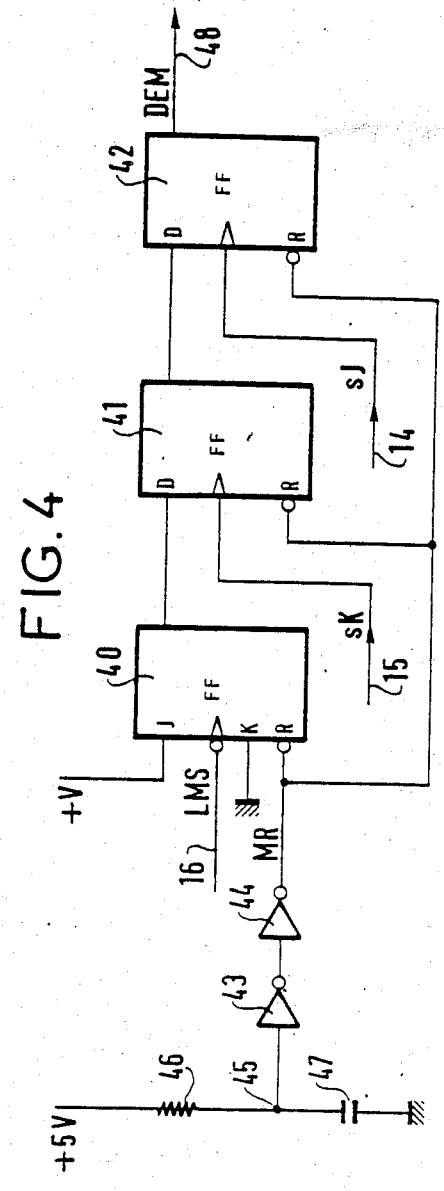

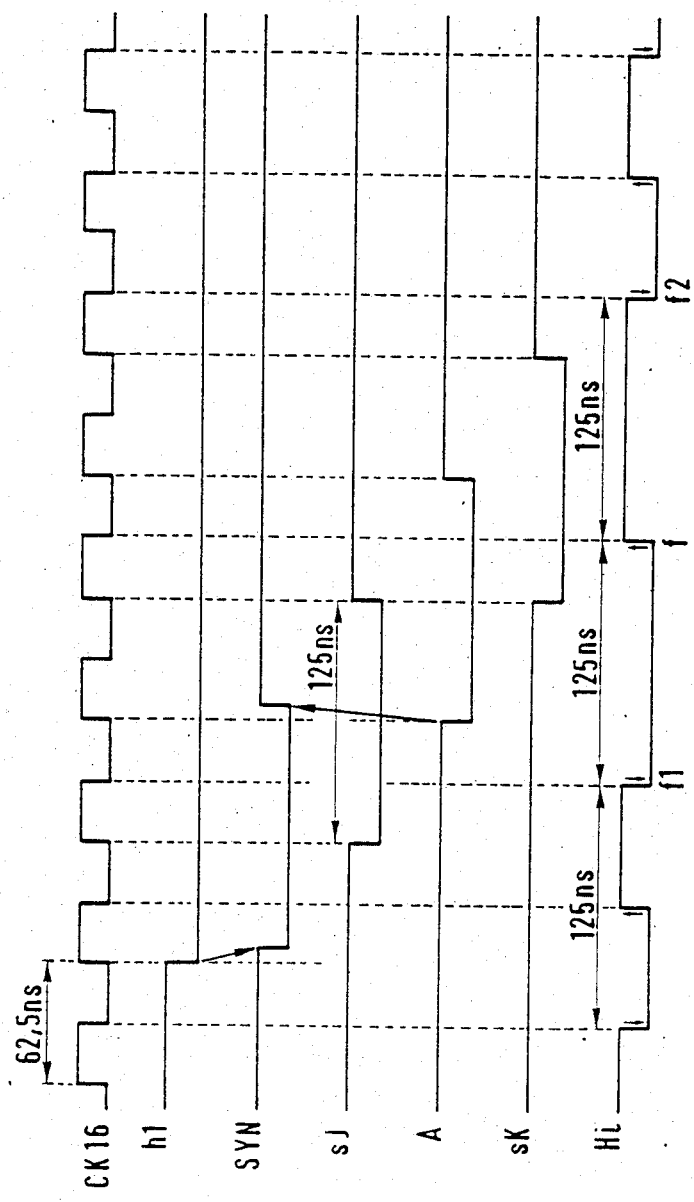

TRIPLICATED CLOCK DISTRIBUTION DEVICE FOR USE WHEN EACH CLOCK SIGNAL COMPRISES A SYNCHONIZATION SIGNAL

BACKGROUND OF THE INVENTION

1. Field of the invention

The invention concerns a triplicated clock distribution device for use when each clock signal comprises a synchronization signal for distributing three clock and synchronization signals from three clocks to user units each comprising a receiver which receives on an AND-OR majority logic circuit the signals each carried by one transmission channel and separates the synchronization signal from the clock signal before these signals are delivered to the user units.

2. Description of the prior art

Such distribution devices are used whenever great stability is required of the clock signal together with great security of operation, as is the case in telephone exchanges, for example.

There exist distribution devices in which each clock signal comprises a synchronization signal consisting in the absence of a clock pulse.

Simulating the synchronization signal by means of the absence of a pulse in the clock signal produces a relatively significant error, in the order of 12%, in the cyclic ratio of the clock signal regenerated in the receivers at the time of the synchronization mark.

An object of the present invention is to achieve an error in the cyclic ratio of the regenerated clock signal at the time of the synchronization mark which is smaller than that given by simulating a synchronization signal by means of the absence of a pulse in the clock signal.

SUMMARY OF THE INVENTION

The object of the invention is a triplicated clock distribution device for use when each clock signal comprises a synchronization signal, the device comprising at least one mother clock, three slave clocks and receivers each having a majority logic circuit connected to the three slave clocks each of which has an oscillator driven by the mother clock, in which device each slave clock comprises a clock generator and a synchronization generator, the clock generator comprises, in addition to the oscillator, a frequency doubler, a frequency divider connected to the frequency doubler and adapted to divide by two the frequency of the signal delivered by said frequency doubler, and an initialization circuit having its output connected to the frequency divider, the synchronization generator comprises an input circuit having its input connected to the synchronization generators of the other two slave clocks and receiving therefrom a clock synchronization signal and a first output connected to the initialization circuit of the frequency divider, a counter having an input connected to the frequency doubler and an initialization input connected to a second output of the input circuit, a JK type flip-flop having a clock input connected to a first output of the counter delivering a first signal, and a shift register driven by the frequency doubler and having its input connected to a complemented output of the flip-flop, said shift register has a first output connected by a first wire to the frequency divider and to the initialization circuit, a second output connected to a reset input of the flip-flop and a third output connected by a second wire to the frequency divider and to the initialization circuit, said frequency divider functions as a divider by four when it receives a pulse from each of the first and third outputs and delivers via an output inverter a clock signal comprising a synchronization signal, the clock signal has the same frequency as the first signal delivered by the counter and the synchronization signal has one half the frequency and a duration of one period of the clock signal, the counter comprises a second output delivering a second signal the frequency of which is half that of the first signal and connected on the one hand to another input of the input circuit and on the other hand to each input circuit of the other two slave clocks through an inverter, and each inverter delivers a clock synchronization signal.

Other characteristics and advantages of the invention will emerge from the following description of embodiments of the invention shown in the accompanying drawings.

BRIEF DESCRIPTION OF THE DRAWINGS

FIG. 3 shows an input circuit of a synchronization generator from FIG. 2.

FIG. 4 shows an initialization circuit of a clock generator from FIG. 2.

FIG. 5 is a signal timing diagram relating to FIG. 2.

DESCRIPTION OF THE PREFERRED EMBODIMENTS

Figure 1:
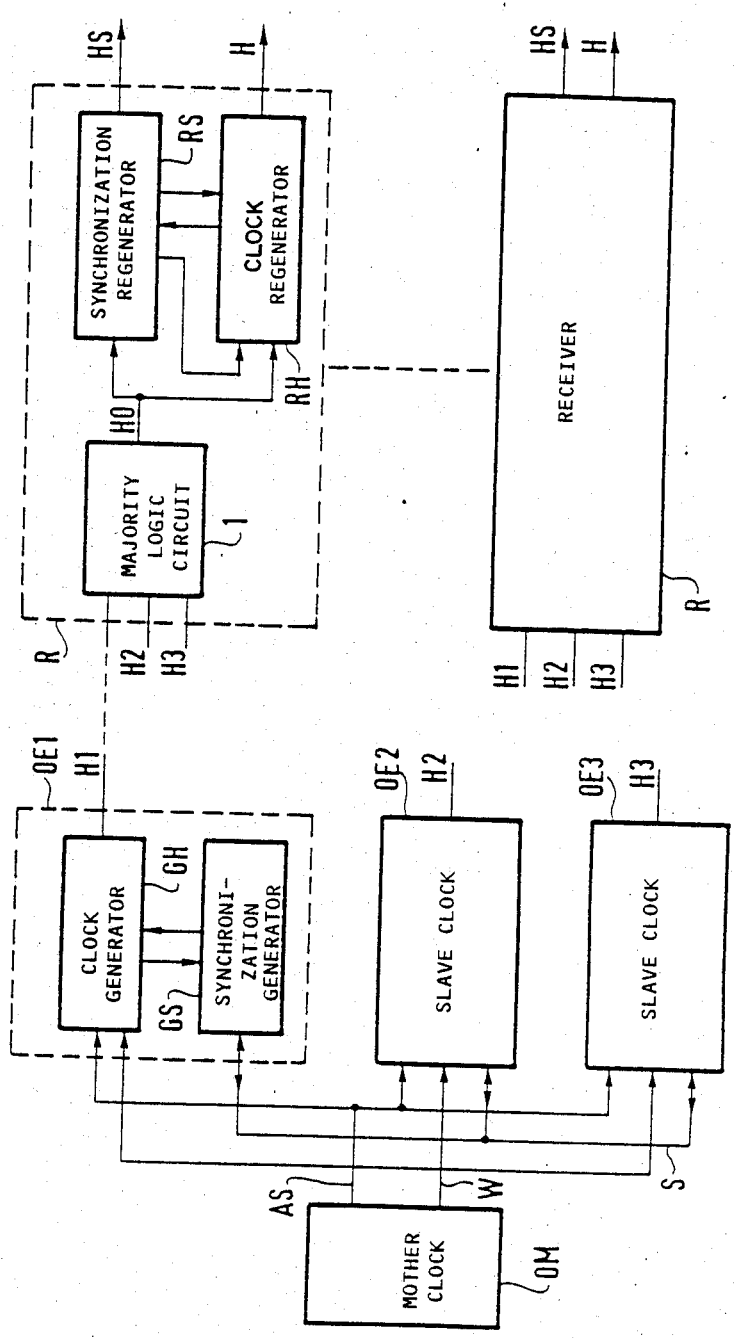
FIG. 1 shows a distribution device in accordance with the invention.

FIG. 1 shows a distribution device in accordance with the invention comprising a mother clock OM, three slave clocks OE1, OE2 and OE3 driven by the mother clock and receivers R. Each slave clock comprises a clock generator GH delivering respective clock signals H1, H2, and H3, and a synchronization generator GS connected to the clock generator. The clock generators are connected to the mother clock by a clock signal line W and by a control signal line AS; the synchronization generators are interconnected by a synchronization line S. The receivers R are identical and each comprises a majority logic circuit 1 having respective inputs connected to each slave clock OE1, OE2 and OE3 and a synchronization regenerator RS and a clock regenerator RH connected to each other and to the majority logic circuit. The synchronization regenerator delivers a synchronization signal HS and the clock regenerator delivers a clock signal H.

Figure 2:
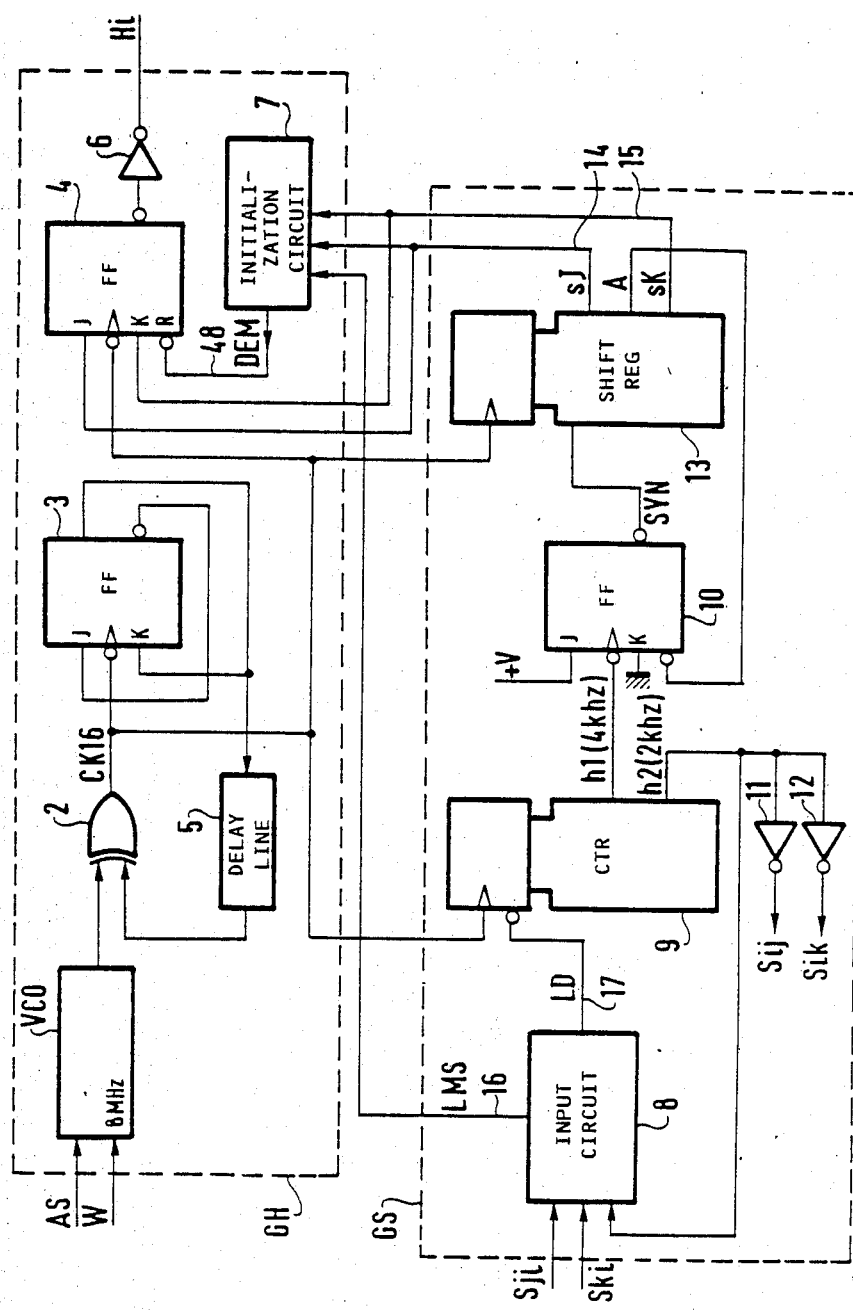
FIG. 2 shows a slave clock of the device of FIG. 1.

FIG. 2 shows a slave clock. In the clock generator GH a voltage-controlled oscillator VCO has its input connected to the mother clock by the clock signal line W and the control line AS and its output connected to one input of an exclusive-OR gate 2; two JK type flip-flops 3 and 4 have their clock input connected to the output of the exclusive-OR gate 2. The direct output of the flip-flop 3 is connected on the one hand to another input of the exclusive-OR gate 2 by a delay line 5 and on the other hand to the K input of the flip-flop 3. The complemented output of the flip-flop 3 is connected to the J input. The complemented output of the flip-flop 4 is connected to an inverter 6 which delivers the clock signal Hi. An initialization circuit 7 has its output connected to the reset input of the flip-flop 4 to which it delivers a start signal DEM on power up.

The synchronization generator GS comprises an input circuit 8 having inputs connected to the synchronization generators of the other two slave clocks from which it receives the clock synchronization signals Sji and Ski (the suffix i relates to the slave clock shown and the suffixes j and k respectively relate to the other two slave clocks); a first output of the input circuit 8 is connected by a wire 16 to the initialization circuit 7. A counter 9 has a clock input connected to the output of the exclusive-OR gate 2 of the clock generator and an initialization input connected by a wire 17 to a second output of the input circuit 8. An output of the counter 9 delivering a first clock signal h1 is connected to the clock input of a JK type flip-flop 10; another output of the counter delivering a second clock signal h2, used for synchronizing the slave clocks, is connected on the one hand directly to an input of the input circuit 8 and on the other hand to two inverters 11 and 12 which deliver respective clock synchronization signals Sij and Sik to the other two slave clocks. The flip-flop 10 has its J input connected to a positive potential +V and its K input grounded. The complemented output of the flip-flop 10 is connected to one input of a shift register 13 having first and third outputs connected by wires 14 and 15 on the one hand to the J and K inputs of the flip-flop 4 of the clock generator GH and on the other hand to the initialization circuit 7 and a second output connected to the reset input of the flip-flop 10 to which it delivers a reset signal A; the wires 14 and 15 respectively carry signals sJ and SK. A clock input of the shift register 13 is connected to the output of the exclusive-OR gate 2 of the clock generator GH.

FIG. 3 shows the input circuit 8 of the synchronization generator GS. This input circuit comprises four inverters 20, 21, 22 and 23, three AND gates 24, 25 and 26, a NOR gate 27, an inverter 28, a flip-flop 29 and a delay circuit 30. The AND gates and the NOR gate constitute a known type of majority logic circuit, the AND gates receiving through the inverters the synchronization signals Sji and Ski delivered by the synchronization generators of the other two slave clocks and the signal H2 from the counter 9 of the synchronization generator in FIG. 2. The output of the NOR gate is connected through the inverter 28 on the one hand to the wire 16 and on the other hand to a clock input of the JK type flip-flop 29 the J input of which is connected to a potential +V and the K input of which is grounded; the complemented output of this flip-flop is connected on the one hand to the wire 17 and on the other hand to a reset input through the delay circuit 30.

FIG. 4 shows the initialization circuit 7 of the clock generator GH in FIG. 2. This circuit essentially comprises a JK type flip-flop 40 and two D type flip-flops 41 and 42. The flip-flop 40 has its clock input connected by the wire 16 to the output of the inverter 28 of the input circuit 8 shown in FIG. 3; its J input is connected to a potential +V and its K input is grounded. The flip-flop 41 has its data input D connected to the direct output of the flip-flop 40 and its clock input connected to the wire 15 (FIG. 2). The flip-flop 42 has its data input D connected to the direct output of the flip-flop 41 and its clock input connected to the wire 14 (FIG. 2). The reset inputs R of the flip-flops 40, 41 and 42 are connected through two inverters 43 and 44 to a point 45 which is common to a resistor 46 and a capacitor 47 connected in series between a potential of +5 V and ground. The direct output of the flip-flop 42 is connected by the wire 48 to the reset input of the flip-flop 4 of FIG. 2.

The operation of a slave clock will now be described, assuming by way of example that the oscillator VCO delivers a signal at a frequency of 8 MHz. In FIG. 2, the exclusive-OR gate 2, the flip-flop 3 and the delay line 5 constitute a frequency doubler; the exclusive-OR gate 2 delivers a signal CK16 at a frequency of 16 MHz, shown in FIG. 5.

The delay line 5 introduces a time-delay into the transmission of the signal from the direct output of the flip-flop 3 and makes it possible to obtain a pulse of the minimum duration required for correct operation by virtue of the characteristics of the flip-flop 3. The exclusive-OR gate 2 makes it possible to obtain a negative pulse at a frequency of 16 MHz on each rising edge of the 8 MHz signal. The counter 9 is incremented by the signal CK16 and delivers the two signals h1 and h2 at respective frequencies of 4 kHz and 2 kHz. The clock signal h1 is fed to the flip-flop 10 and the clock signal h2 is used for mutual synchronization of the counters 9 of the slave clocks through the intermediary of the majority logic circuit of the input circuits 8. When the counters of two of the three slave clocks indicate overlapping phases of the signals h2, a synchronization majority signal LMS at the output of the inverter 28 in FIG. 3 is applied to the flip-flop 29 which generates a counter initialization pulse LD with a duration of 100 nanoseconds; this pulse simultaneously initializes the three counters 9 of the slave clocks to the same value, since it is generated by each input circuit 8. The negative edge of the clock signal h1 applied to the clock input of the flip-flop 10 sets a synchronization pulse SYN delivered by the complemented output of this flip-flop and which drives the serial input of the shift register 13. This shift register delivers two out of phase pulses sJ and sK at a frequency of 8 MHz that are synchronous with the 16 MHz signal CK16; each of the pulses sJ and sK has a duration equal to two periods of the signal CK16 delivered by the frequency doubler (125 ns), the phase shift of the pulse sK being equal to two periods of the signal CK16; the shift register also delivers a pulse A shifted by one period of the signal CK16 relative to the pulse sJ and the duration of which is equal to two periods of the signal CK16.

The flip-flop 4 (FIG. 2) restores the 8 MHz clock signal from the osciallator VCO outside the synchronization pulse. During the synchronization pulse SYN delivered by the flip-flop 10, the J and K inputs of the flip-flop 4 in turn go through the zero state, which forces the state of the flip-flop and reduces its switching frequency; there is obtained in this way, on the output side of the inverter 6 connected to the complemented output of the flip-flop 4, the 8 MHz clock signal Hi, that is to say, in FIG. 1, the clock signals H1, H2 and H3 delivered by the slave clocks OE1, OE2 and OE3. This reduction of the frequency is similar to inverting the active edge of the clock signal Hi shown in FIG. 5, which is a timing diagram for the signals indicated in FIG. 2; the edge f of the clock signal Hi is a positive edge, whereas without the frequency change this edge would be a negative edge. Note that the change in the frequency of the clock signal Hi has a duration of 250 nanoseconds between the edges f1 and f2 and corresponds to a synchronization signal incorporated into the clock signal Hi with a repetition frequency of 4 kHz. The flip-flop 4 thus functions as a frequency divider, dividing by two or by four the frequency of the signal CK16 delivered by the frequency doubler.

Figure 6:
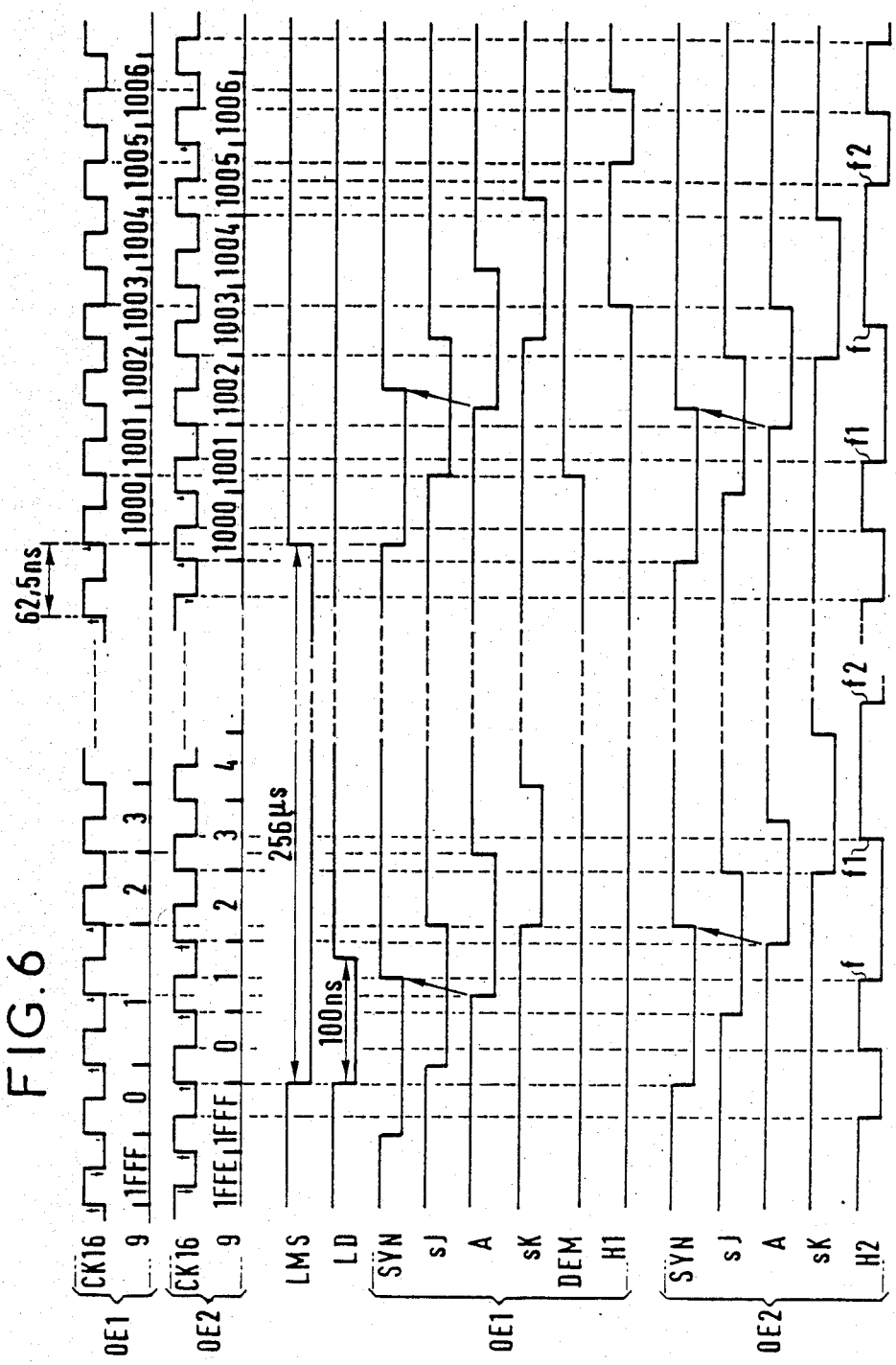
FIG. 6 is a signal timing diagram relating to two slave clocks.

FIG. 6 is a timing diagram of the signals in the slave clocks OE1 and OE2, assuming that the slave clock OE2 is operating and that the slave clock OE1 is turned on. When the slave clock OE1 is turned on, its flip-flop 4 is blocked by the initialization circuit 7, the start signal DEM having the value 0; the corresponding clock signal H1 is therefore blocked. The counter 9 of the synchronization generator advances, and immediately the counters 9 of the two slave clocks OE1 and OE2 are approximately in phase, the majority logic circuit of each input circuit 8 delivers a synchronization majority signal LMS applied on the one hand to the flip-flop 29 which delivers the counter initialization pulse LD and on the other hand to the initialization circuit 7. In the slave clock OE1 which has just been turned on, the 4 kHz clock signal h1 is used to obtain the signals SYN, sJ and sK; the signal SK makes it possible (FIG. 4) to recognize by means of the flip-flop 41 the output signal from the flip-flop 40 which has received the synchronization majority signal LMS. The counter 9 of the slave clock OE1 having been initialized (reset to zero), the clock signal h1 again generates, 250 microseconds later, the signals SYN, sJ and sK, as shown in FIG. 6. The signal sJ makes it possible to recognize, through the flip-flop 42 of the initialization circuit 7, the signal previously delivered by the flip-flop 41; the flip-flop 42 delivers the start signal DEM authorizing operation of the flip-flop 4 of the clock generator GH, which can then deliver the clock signal H1.

Figure 7:
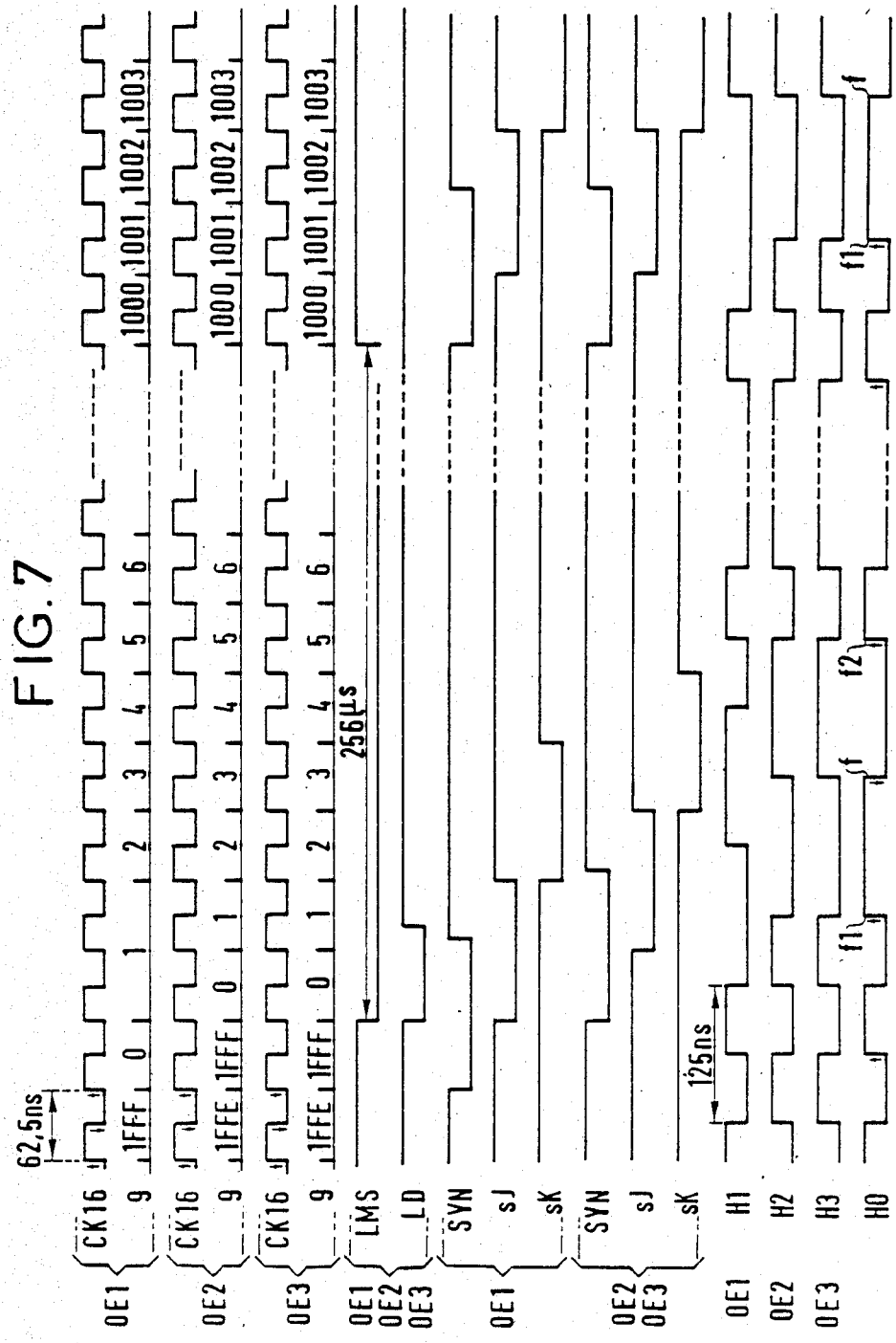
FIG. 7 is a signal timing diagram relating to three slave clocks.

The timing diagram of FIG. 7 relates to the signals in the three slave clocks and shows that the relative phase shift between the three clock signals H1, H2, H3 cannot exceed one half-period; in this figure the clock signals H2 and h3 are in phase and the clock signal Hl is out of phase by one half-period; the synchronization majority signal LMS and the counter initialization pulse LD appear simultaneously in the three slave clocks, which makes it possible to generate a synchronization signal in each of the clock signals H1, H2 and H3. The counters 9 having been initialized simultaneously, the signals SYN, sJ and sK are present and in phase in the three slave clocks, since the clock signals h1 delivered by the counters are in phase. In the slave clock OE1, the flip-flop 4 (FIG. 2) is forced by the signals sJ and sK and this brings about a jump in the phase of clock signal H1; this achieves phase locking which prevents the absorption of a clock pulse and the masking of a synchronization pulse by the majority logic circuit 1 of the receivers.

Figure 8:
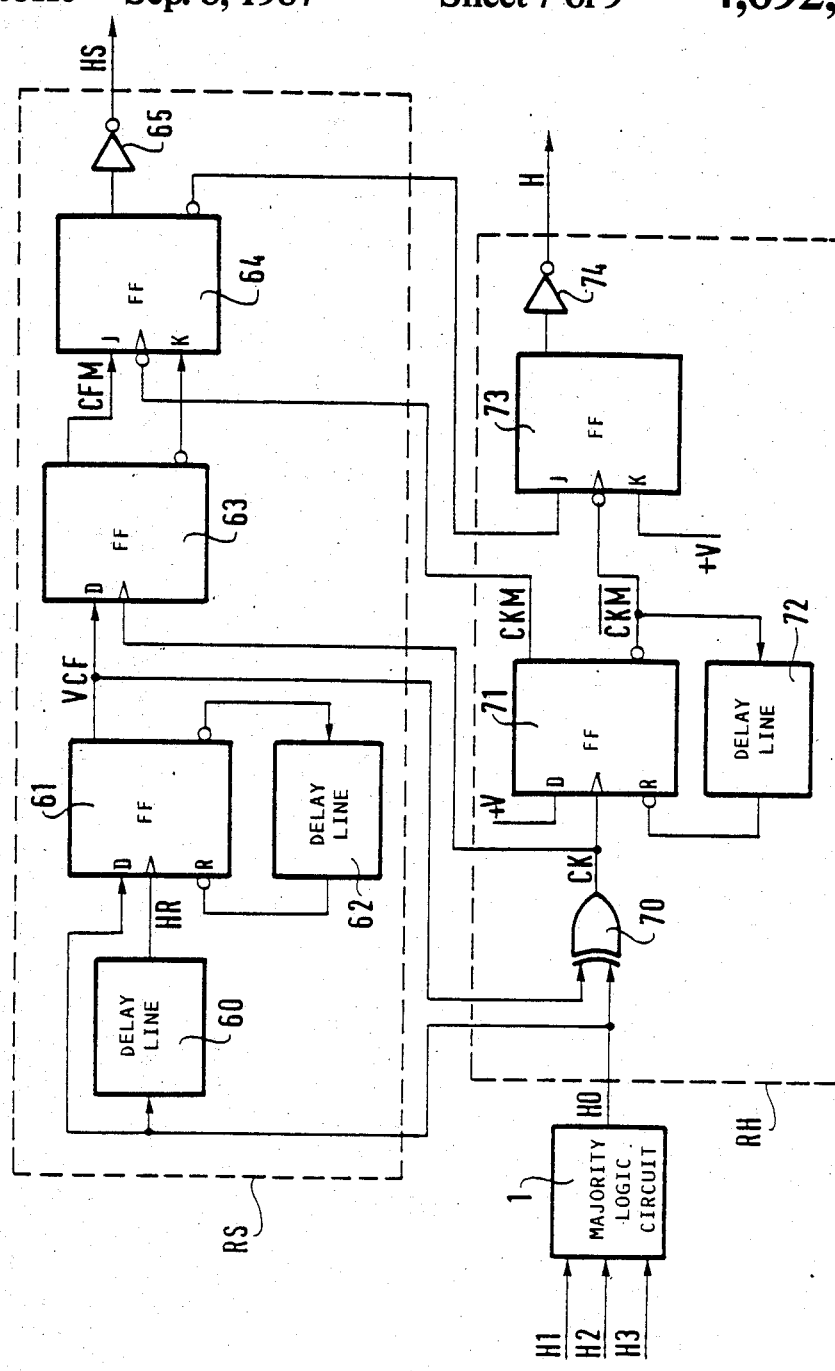
FIG. 8 shows a receiver from FIG. 1.

FIG. 8 shows a receiver R from FIG. 1. The majority logic circuit 1 comprises three AND gates and one NOR gate, in the known manner, and delivers a majority clock signal HO. The synchronization regenerator RS comprises a first delay line 60 connected to the output of the majority logic circuit 1, a D type first flip-flop 61 the clock input of which is connected to the output of the first delay line 60 and the input of which is connected to the output of the majority logic circuit, and a second delay line 62 having its input connected to the complemented output of the first flip-flop 60 and its output connected to a reset input of the first flip-flop; a D type second flip-flop 63 has its input connected to the direct output of the first flip-flop 61 and its direct output connected to the J input of a JK type third flip-flop 64; its complemented output is connected to the K input of the third flip-flop the direct output of which is connected to an inverter 65 which delivers a synchronization signal HS.

The two delay lines 60 and 62 and the flip-flop 61 constitute a circuit for testing the duration of the clock pulses, and the flip-flops 63 and 64 constitute a circuit for restoring the synchronization signal.

The clock regenerator RH comprises an exclusive-OR gate 70 having one input connected to the output of the majority logic circuit 1 and another input connected to the direct output of the first flip-flop 61 of the synchronization regenerator RS; a D type first flip-flop 71 has its input connected to a positive potential +V, its clock input connected to the output of the exclusive-OR gate 70, its direct output connected to the clock input of the third flip-flop 64 and its complemented output connected by a delay line 72 to its reset input; a JK type second flip-flop 73 has its clock input connected to the complemented output of the second flip-flop 71, its J input connected to the complemented output of the third flip-flop 64, its K input connected to the positive potential +V and its direct output connected to an inverter 74 which delivers the clock signal H. The output of the exclusive-OR gate 70 is also connected to the clock input of the second flip-flop 63 of the synchronization regenerator RS. The majority logic circuit 1 delivers a clock majority signal HO which is passed to the flip-flop 71 by the exclusive-OR gate 70. The flip-flop 71 and the delay line 72 constitute a regeneration and filter circuit for regenerating and filtering the clock signal; the flip-flop 73 constitutes a circuit for synchronizing and dividing down the clock signal.

Figure 9:
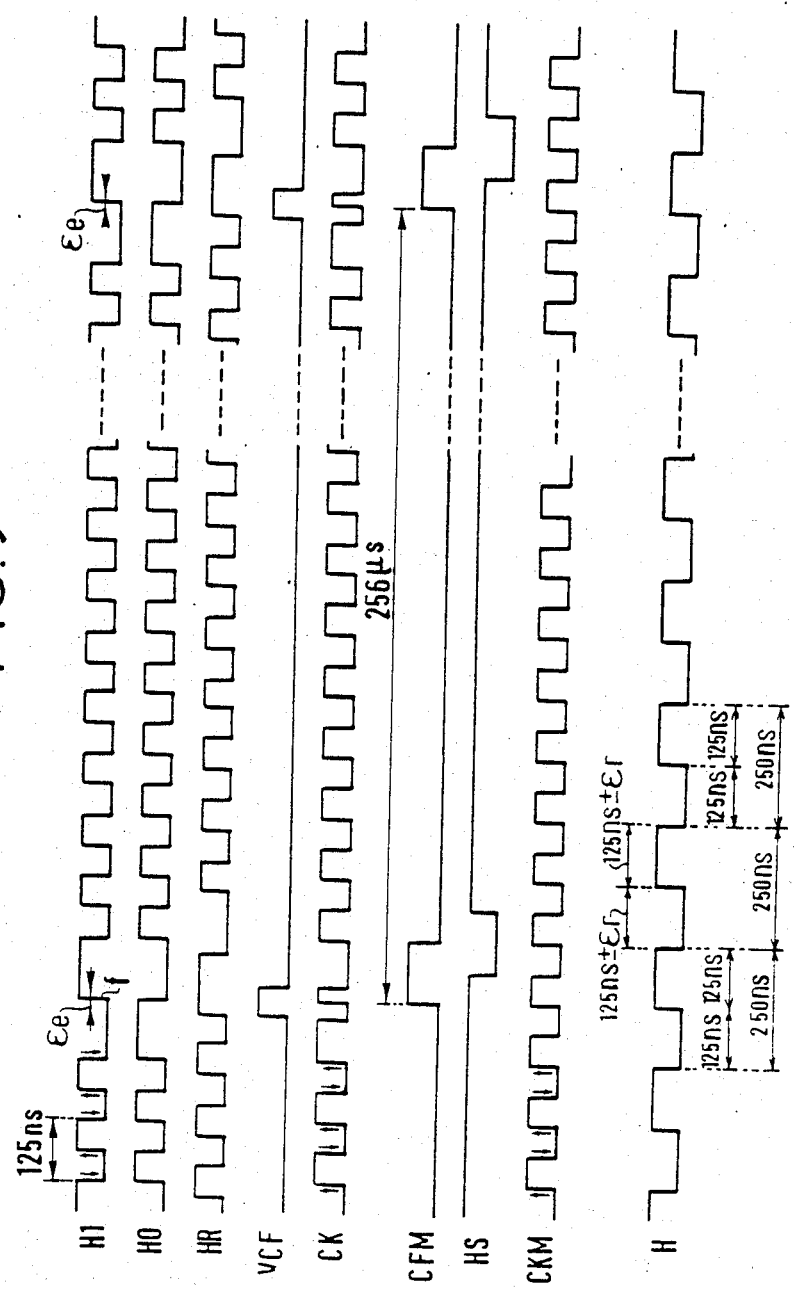
FIG. 9 is a signal timing diagram relating to the receiver of FIG. 8.

In returning to the example of the slave clocks, the clock signals H1, H2 and H3 received by the majority logic circuit 1 are at a frequency of 8 MHz and each comprises a synchronization signal. FIG. 9 is a timing diagram for the various signals in the receiver of FIG. 8; assuming that the signals H1, H2 and H3 received by the majority logic circuit 1 are in phase, the clock majority signal HO is obtained at the output; the first delay line 60 introduces a time-delay between one half-period and one period of the clock signal HO, that is 80 nanoseconds, for example, and delivers a delayed clock signal HR. The flip-flop 61 delivers a pulse VCF the width of which is set by the delay line 62, to value of 50 nanoseconds, for example. This pulse VCF appears when the synchronization signal incorporated in the clock signals H1, H2 and H3 and therefore in the clock majority signal HO is recognized by the delayed clock signal HR. This pulse VCF is applied to the exclusive-OR gate 70 and causes in the signal CK delivered by said exclusive-OR gate an inversion of the edge corresponding to the edge f of the synchronization signal in the clock majority signal HO. The flip-flop 63 delivers a pulse CFM the duration of which is equal to that of the synchronization pulse of the clock signal H1. The flip-flop 71 delivers on its direct output a clock signal CKM and on its complemented output a clock signal $\overline{\text{CKM}}$; these clock signals are at the same frequency as the clock majority signal HO, with the clock signal regenerated at the time of the synchronization signal included in the clock majority signal HO. The delay line 72 introduces a time-delay of approximately one half-period of the signal CK into the transmission of the signal $\overline{\text{CKM}}$ delivered by the complemented output of the flip-flop 71. In the third flip-flop 64 the signal CFM is recognized by the clock signal CKM; at the output of the inverter 65 there is obtained the synchronization signal HS. The second flip-flop 73 divides by two the frequency of the signal $\overline{\text{CKM}}$ and the inverter 74 delivers the 4 MHz clock signal H; the signal delivered by the complemented output of the third flip-flop 64, which is identical to the complement of the synchronization signal HS, is applied to the input 5 of the second flip-flop 73 and enables the clock signal H to be synchronized.

Figure 10:
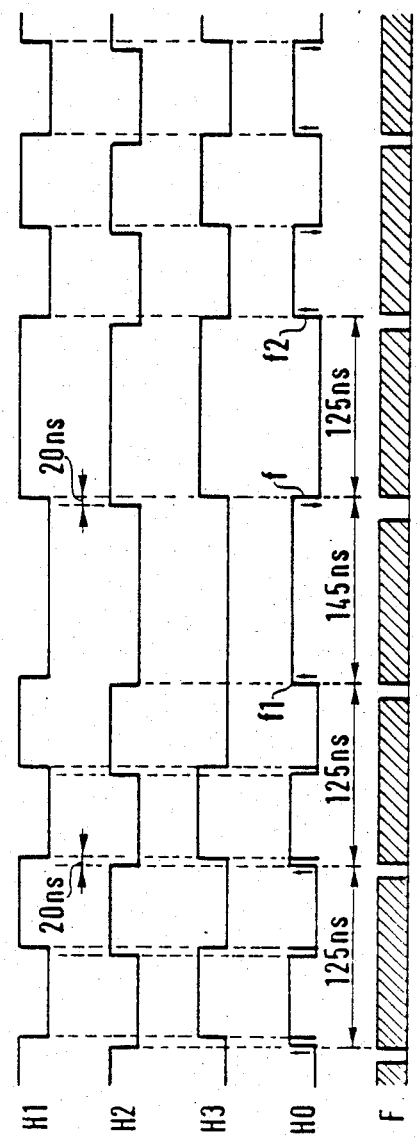
FIG. 10 is a signal timing diagram relating to a majority logic circuit and a detection and filter circuit of a receiver.

The starting up of a slave clock results in phase shifts between the clock signals H1, H2 and H3. This phenomenon is associated with the slave clock control system response time. The system controlling the voltage-controlled oscillators VCO limits to 20 nonoseconds the time difference between the clock signals under normal operating conditions. Further phase control is implemented in each slave clock by forcing the flip-flop 4, as previously described. In a receiver, the starting up of a slave clock produces spurious pulses on the clock majority signal HO, as shown in FIG. 10 which is a timing diagram for the clock signals H1, H2, H3 and HO. In this figure the signals H1 and H2 are in phase, with a maximum phase shift of 20 nanoseconds. The starting up of the third slave clock OE3 causes spurious pulses on the signal HO when there is a phase opposition relationship between the clock signal H3 and the clock signal delivered by one of the other two slave clocks. These spurious pulses are filtered by the delay line 72 which loops the complemented output of the flip-flop 71 to its reset input, the delay introduced being between one half-period and one period of the majority clock signal HO; with the values previously taken by way of example, the delay is in the order of 100 nanoseconds; the combination of the flip-flop 71 and delay line 72 is equivalent to a monostable. In FIG. 10, the line F concerns the filtering action. After the synchronization pulse the clock signal H3 is again in phase with the clock signals H1 and H2 and the spurious pulses disappear from the clock majority signal HO. In the timing diagram of FIG. 10 note that the phase jump in the clock signal H3 causes lengthening of the clock majority signal HO between the edges f and f2, equivalent to the offset between the clock signals H1 and H2, which is 20 nanoseconds in the example considered; this lengthening is not troublesome for the user circuits connected to the receiver.

In a slave clock, at the time of the synchronization pulse the flip-flop 4 which delivers the clock signal Hi changes its operating frequency; this change inverts the active edge of the 8 MHz clock signal, this edge being marked f in the timing diagrams. On a transmission line connecting a slave clock to a receiver there is a difference between the propagation times for the active and negative edges of the clock signal hi; this difference is in the order of 0.5 nanosecond. This difference must be added to the difference between the switching times $t_{pLH}$ and $t_{pHL}$ of the flip-flop 4 and the inverter 6, namely 0.5 nanosecond for the flip-flop and 1 nanosecond for the inverter; in all, at the input of the majority logic circuit 1 of a receiver the error is:

$$\epsilon e = 2 \text{ ns}$$

In a receiver, at the time of the synchronization pulse the accuracy of the cyclic ratio of the clock signal H1, the frequency of which is then 4 MHz, is conditioned by the propagation time difference between the switching times $t_{pHL}$ and $t_{pLH}$ of the majority logic circuit 1 and the exclusive-OR gate 70, namely 1 nanosecond for the majority logic circuit and 1 nanosecond for the exclusive-OR gate, giving $\epsilon r = 2$ nanoseconds between a clock signal Hi and the signal CK at the output of the exclusive-OR gate.

Thus at the time of a synchronization pulse the error in respect of the cyclic ratio of the clock signal H delivered by a receiver is equal to:

$$\epsilon e + \epsilon r = 4 \text{ ns}$$

and the relative error is:

$$4/125 \times 100 = 3.2\%$$

This relative error is thus significantly less than that (12%) of a system in which the synchronization pulse is simulated by the absence of a pulse in a clock signal; the result is improved accuracy of the pulses, the synchronization signal HS and the clock signal H delivered by the receivers.

There is claimed:

1. Triplicated clock distribution device for use when each clock signal comprises a synchronization signal, the device comprising at least one mother clock, three slave clocks and receivers each having a majority logic circuit connected to the three slave clocks each of which has an oscillator driven by the mother clock, in which device each slave clock comprises a clock generator and a synchronization generator, the clock generator comprises, in addition to the oscillator, a frequency doubler, a frequency divider connected to the frequency doubler and adapted to divide by two the frequency of the signal delivered by said frequency doubler, and an initialization circuit having its output connected to the frequency divider, the synchronization generator comprises an input circuit having its input connected to the synchronization generators of the other two slave clocks and receiving therefrom a clock synchronization signal and a first output connected to the initialization circuit of the frequency divider, a counter having an input connected to the frequency doubler and an initialization input connected to a second output of the input circuit, a JK type flip-flop having a clock input connected to a first output of the counter delivering a first signal, and a shift register driven by the frequency doubler and having its input connected to a complemented output of the flip-flop, said shift register has a first output connected by a first wire to the frequency divider and to the initialization circuit of the frequency divider, a second output connected to a reset input of the flip-flop and a third output connected by a second wire to the frequency divider and to the initialization circuit of the frequency divider, said frequency divider functions as a divider by four when it receives a pulse from each of the first and third outputs and delivers via an output inverter a clock signal comprising a synchronization signal, the clock signal has the same frequency as the first signal delivered by the counter and the synchronization signal has one half the frequency and a duration of one period of the clock signal, the counter comprises a second output delivering a second signal the frequency of which is half that of the first signal and connected on the one hand to another input of the input circuit and on the other hand to each input circuit of the other two slave clocks through an inverter, and each inverter delivers a clock synchronization signal.

2. Distribution device according to claim 1, wherein the frequency divider is a JK type flip-flop having a clock input connected to the frequency doubler, a first input connected to the first output of the shift register by the first wire, a second input connected to the third output of the shift register by the second wire, a reset input connected to the initialization circuit of the frequency divider and a complemented output connected to the output inverter, the first and third outputs of the shift register each deliver a pulse the duration of which is equal to two periods of the signal delivered by the frequency doubler, the pulse delivered by the third output is shifted relative to the pulse delivered by the first output by the width of this pulse and the second output of the shift register delivers a pulse of the same width as the pulse delivered by the first output and shifted relative to it by half of a pulse width.

3. Distribution device according to claim 1, wherein the input circuit comprises a majority logic circuit, a JK type flip-flop and a delay line, the majority logic circuit has an input connected to receive the clock synchronization signals and an output connected to a clock input of the flip-flop, said output of the majority logic circuit constitutes the first output of the input circuit connected to the initialization circuit, the flip-flop has a first input adapted to be connected to a positive potential, a second input grounded and a complemented output constituting the second output of the input circuit, and said complemented output is also connected by the delay line to its reset input.

4. Distribution device according to claim 1, wherein the initialization circuit of the frequency divider comprises a JK type first flip-flop, a D type second flip-flop and a D type third flip-flop, a reset input of each flip-flop is adapted to be connected to a positive potential through two inverters in series, the first flip-flop has a first input adapted to be connected to another positive potential, a second input grounded and a clock input connected to the first output of the input circuit, the second flip-flop has an input connected to a direct output of the first flip-flop and a clock input connected to the third output of the shift register, and the third flip-flop has an input connected to a direct output of the second flip-flop, a clock input connected to the first output of the shift register and a direct output connected to a reset input of the frequency divider.

5. Distribution device according to claim 1, wherein each receiver further comprises a clock regenerator and a synchronization regenerator having their inputs connected to the majority logic circuit which delivers a majority clock signal, the clock regenerator comprises an exclusive-OR gate having an input connected to the majority logic circuit, a regeneration and filter circuit which is connected to the exclusive-OR gate in order to regenerate and filter the clock signal in the clock majority signal transmitted by the exclusive-OR gate and which has first and second outputs, and a synchronization and divider circuit driven by a signal delivered by the second output of the regeneration and filter circuit and delivering through an output inverter a clock signal, the synchronization regenerator comprises a circuit for testing the duration of the pulses of the majority clock signal and a circuit for restoring the synchronization signal, said test circuit has its output connected to an input of the exclusive-OR gate and to the restore circuit, and said restore circuit is connected on the one hand and on the output side to the exclusive-OR gate and on the other hand to the first output of the regeneration and filter circuit and has a first output connected to an output inverter to deliver the synchronization signal and a second output connected to an input of the synchronization and divider circuit.

6. Distribution device according to claim 5, wherein the detection and filter circuit comprises a D type flip-flop and a delay line, said flip-flop has a clock input connected to the output of the exclusive-OR gate, a data input adapted to be connected to a positive potential, a direct output and a complemented output connected to a reset input of the flip-flop through the delay line, and the direct and complemented outputs constitute the first and second outputs of the detection and filter circuit.

7. Distribution device according to claim 5, wherein the synchronization and divider circuit comprises a JK type flip-flop having a clock input connected to the second output of the regeneration and filter circuit, a first input connected to the output of the restore circuit, a second input adapted to be connected to a positive potential and a direct output connected to the output inverter to deliver the clock signal.

8. Distribution device according to claim 5, wherein the test circuit comprises a D type flip-flop and first and second delay lines, a data input of the flip-flop and an input of the first delay line are connected to the majority logic circuit, the first delay line output is connected to a clock input of the flip-flop, a complemented output of the flip-flop is connected to a reset input by the second delay line, and a direct output of the flip-flop constitutes the output of the test circuit.

9. Distribution device according to claim 5, wherein the restore circuit comprises a D type first flip-flop and a JK type second flip-flop, the first flip-flop has a data input connected to the output of the test circuit, a clock input connected to the exclusive-OR gate, a direct output connected to the first input of the second flip-flop and a complemented output connected to a second input of the second flip-flop, and the second flip-flop has a clock input connected to the first output of the regeneration and filter circuit and a direct output and a complemented output constituting the first and second outputs of the restore circuit.

* * * * *